United States Patent
Majeres et al.

(10) Patent No.: US 12,176,996 B2
(45) Date of Patent: Dec. 24, 2024

(54) TRANSPORTABLE SATELLITE ANTENNA TERMINAL

(71) Applicant: DataPath, Inc., Duluth, GA (US)

(72) Inventors: Brad Majeres, Buford, GA (US); Chris Chechele, Johns Creek, GA (US); Michael Hicks, Sandy Springs, GA (US); Steve Kovar, Dunwoody, GA (US); Thomas Holman, Atlanta, GA (US)

(73) Assignee: DATAPATH, INC., Duluth, GA (US)

( * ) Notice: Subject to any disclaimer, the term of this patent is extended or adjusted under 35 U.S.C. 154(b) by 295 days.

(21) Appl. No.: 17/682,936

(22) Filed: Feb. 28, 2022

(65) Prior Publication Data

US 2022/0286200 A1 Sep. 8, 2022

Related U.S. Application Data (60) Provisional application No. 63/158,149, filed on Mar. 8, 2021.

(51) Int. Cl.
*H04B 7/185* (2006.01)
*H01Q 15/16* (2006.01)

(52) U.S. Cl.
CPC ....... *H04B 7/18517* (2013.01); *H01Q 15/165* (2013.01)

(58) Field of Classification Search
CPC ... H01Q 15/165; H01Q 19/19; H04B 7/18517
USPC ...................................................... 455/13.4
See application file for complete search history.

(56) References Cited

U.S. PATENT DOCUMENTS

| | | | | |
|---|---|---|---|---|
| 3,789,415 A | * | 1/1974 | Vickland | H01Q 3/04 254/336 |
| 3,977,773 A | * | 8/1976 | Hubbard | F24S 23/71 126/690 |
| 4,899,167 A | * | 2/1990 | Westphal | H01Q 15/162 343/915 |

(Continued)

FOREIGN PATENT DOCUMENTS

| | | |
|---|---|---|
| CA | 2220158 | 5/1999 |
| WO | 2011108015 | 9/2011 |

OTHER PUBLICATIONS

International Search Report and Written Opinion relative to international application No. PCT/US2022/018185, mailed Aug. 2, 2022; 17 pages.

*Primary Examiner* — Tan H Trinh
(74) *Attorney, Agent, or Firm* — Smith, Gambrell & Russell, LLP (57) ABSTRACT

A portable antenna terminal includes a deck on which is mounted a storage frame, and on which there is also supported an antenna that includes a kingpost shaft and a modular reflector that is formed from a plurality of reflector panels and a central reflector hub. The storage frame defines a storage space for storing the plurality of reflector panels and a receptacle for secured reception of the reflector hub. When fully loaded with all terminal components, the terminal has a total weight of equal to or less than 10,000 lbs., preferably equal to or less than 7,500 lbs., and more preferably equal to or less than 5,000 lbs. In a storage configuration, with the modular antenna components secured in stored positions, the terminal has dimensions equal to or less than 84 in. L×104 in. W×92 in. H.

22 Claims, 7 Drawing Sheets

(56) References Cited

U.S. PATENT DOCUMENTS

| | | | | |
|---|---|---|---|---|
| 5,257,034 A | * | 10/1993 | Turner | H01Q 15/20 |
| | | | | 343/915 |
| 6,198,457 B1 | * | 3/2001 | Walker | H01Q 1/005 |
| | | | | 343/912 |
| 8,867,986 B1 | | 10/2014 | Tarpley, Jr. | |
| 8,897,986 B2 | * | 11/2014 | Ono | B60T 8/1755 |
| | | | | 701/72 |
| 2004/0196207 A1 | * | 10/2004 | Schefter | H01Q 19/132 |
| | | | | 343/878 |
| 2008/0290228 A1 | | 11/2008 | Haight | |
| 2010/0147343 A1 | * | 6/2010 | DeVries | H01Q 1/1207 |
| | | | | 135/90 |
| 2014/0158854 A1 | * | 6/2014 | Conrad | H01Q 1/12 |
| | | | | 248/544 |
| 2015/0349417 A1 | * | 12/2015 | Richards | H01Q 3/08 |
| | | | | 342/352 |
| 2016/0156107 A1 | * | 6/2016 | Lee | H01Q 1/1207 |
| | | | | 29/601 |
| 2017/0140344 A1 | | 5/2017 | Bowers et al. | |
| 2019/0131698 A1 | * | 5/2019 | Conrad | H01Q 1/428 |
| 2020/0006839 A1 | * | 1/2020 | Moheb | H01Q 3/08 |

* cited by examiner

FIG. 8
--PRIOR ART--

TRANSPORTABLE SATELLITE ANTENNA TERMINAL

FIELD OF THE INVENTION

The present invention relates to transportable satellite antenna terminals and methods of using the same for facilitating intermodal transportation of satellite antenna terminals.

BACKGROUND OF THE INVENTION

Information and situational awareness are substantial force multiplying factors that greatly increase the likelihood of military forces in achieving mission objectives that would otherwise require a far greater number of personnel. Communication systems for acquiring and distributing information have thus become a critical tool to militaries around the world.

It is now common practice for modern militaries to provide deployed units with one or more transportable ground satellite terminals for use in accessing a satellite network for continuous sharing of real-time information and communications. This practice presents complications, however, in that the size, mass and complexity of conventional ground satellite terminals present considerable limitations on the transportation and deployment options of those systems. Indeed, some conventional ground satellite units exceed 10,000 lbs. in weight and require transportation via large vehicles and platforms (e.g., ISO 668 1C freight containers, measuring approximately 20 ft. L×8 ft. W×8 ft. H), thereby requiring substantial resources and personnel for transporting and deploying the satellite systems.

Thus, there remains a need for improvements to transportable ground satellite terminals to further facilitating transportation and deployment of such systems with minimal resources.

SUMMARY OF THE INVENTION

The present invention is inclusive of a portable antenna terminal, comprising: a deck having a deck body and a top support surface; a storage frame mounted to the top support surface of the deck, the storage frame defining a first storage space dimensioned for storing a plurality of reflector panels; and an antenna comprising an antenna kingpost shaft, an antenna positioner, and a parabolic reflector, wherein the deck is configured with dimensions equal to or less than 84 in. L×104 in. W.

The portable antenna terminal further comprises: a power enclosure mounted to the top support surface of the deck, the power enclosure housing electrical systems for powering one or more electrical components of the terminal; a uninterruptable power subsystem (UPS) enclosure mounted to the top support surface of the deck, the UPS enclosure housing electrical systems for converting the current and/or frequency of an electrical energy received from an external power source and providing battery backup; and a control enclosure mounted to the top support surface of the deck, the control enclosure housing operational hardware for controlling operation of one or more components of the terminal.

The deck comprises one or more transport structures for facilitating movement and transportation of the terminal, for example in the form of a pair of channels formed in the body of the deck that are dimensioned and spaced for the insertion of forklift forks and multiple hoist rings for use with one or more support cables for lifting the deck by a hoisting device as well as tie-down. The storage frame further defines a second storage space dimensioned for storing one or more modem transit cases, and wherein the terminal further comprises one or more transit cases each housing a modem for user operation in controlling the terminal.

The parabolic reflector is a modular reflector is configured to disassemble into separate components comprising a plurality of circumferential reflector panels, and the first storage space of the storage frame that is dimensioned for reception of the plurality of reflector panels is defined between two surfaces that form an angle therebetween that corresponds with an angle formed by circumferential peripheral edges of the individual reflector panels. The modular parabolic reflector further comprises a central reflector hub, and the storage frame further comprises a receptacle for secured reception of the reflector hub.

The portable antenna terminal, inclusive of all terminal components including the power enclosure mounted to the top support surface of the deck, housing electrical systems for powering one or more electrical components of the terminal; the UPS enclosure mounted to the top support surface of the deck, housing electrical systems for converting the current and/or frequency of an electrical energy received from an external power source; the control enclosure mounted to the top support surface of the deck, housing operational hardware for controlling operation of one or more components of the terminal; and one or more transit cases, each housing a modem for user operation in controlling the terminal, has a total weight of equal to or less than 10,000 lbs., preferably equal to or less than 7,500 lbs., and more preferably equal to or less than 5,000 lbs. The terminal is further configured such that, when in a storage state, with the modular antenna components secured in stored positions, the terminal has a maximum height of less than 92 in.

The storage frame mounted to the top support surface of the deck defines at least one storage space dimensioned for storing a plurality of reflector panels, with at least one support panel suspended above the top support surface of the deck, and the storage space defined between the at least one suspended support panel and the top support surface of the deck. In some examples the at least one suspended support panel is suspended in a parallel orientation relative to the top support surface of the deck, and in some examples the at least one suspended support panel is suspended in an oblique orientation relative to the top support surface of the deck. In a preferred example, the storage frame comprises at least two support panels suspended above the top support surface of the deck, including a first support panel suspended in a parallel orientation relative to the top support surface of the deck and a second support panel suspended in an oblique orientation relative to the top support surface of the deck, with the storage space dimensioned for storing a plurality of reflector panels defined below the first parallel-oriented support panel. Preferably, the storage space dimensioned for storing a plurality of reflector panels is defined below the second obliquely-oriented support panel.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

The present invention is inclusive of systems and methods for facilitating the transportation and deployment of ground satellite antenna terminals. Examples of the present invention are inclusive of a self-contained communications system dimensioned for transportation on an intermodal platform that is adapted for use in several transportation systems, including, though not limited to land vehicles, marine vessels, and air and spacecraft. Preferably, the intermodal platform is further adapted to cooperate with mating transport mechanisms in the several transportation systems so as to enable selective transfer of the platform between two or more separate transportation systems while the communications system remains loaded thereon.

Figure 8:
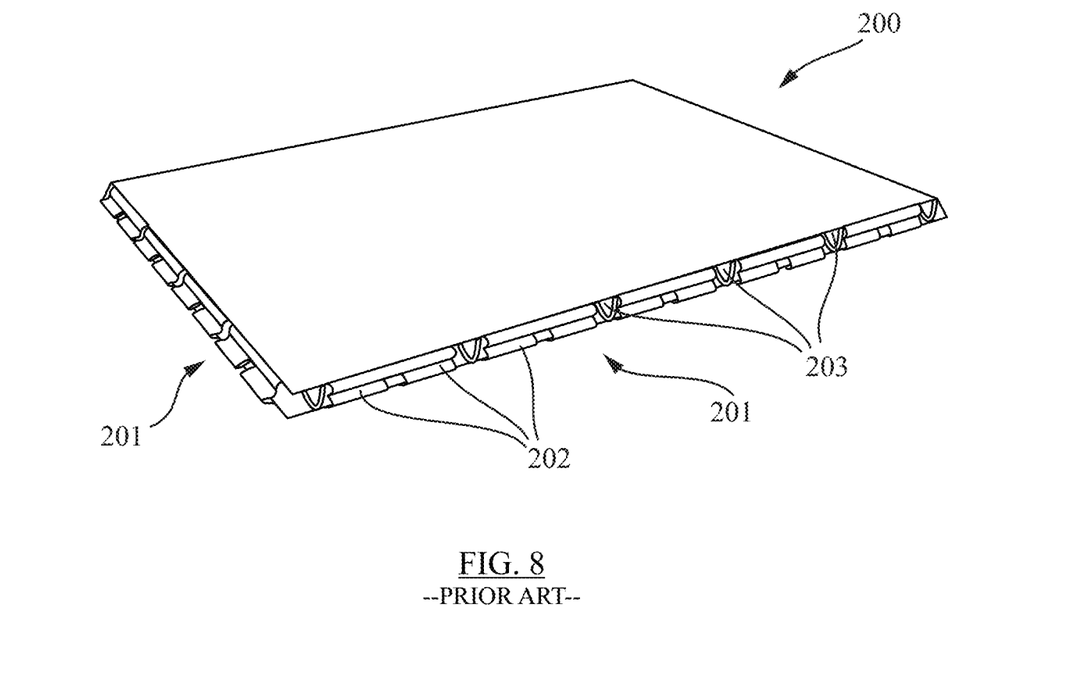
FIG. 8 shows a conventional 463L master pallet.

In one preferred embodiment, the present invention is inclusive of a communications system in the form of a satellite antenna terminal 100 that is dimensioned for transportation on a standardized intermodal platform, such as a 463L Master Pallet 200 as seen in FIG. 8. The 463L Master Pallet 200 (also known as the HCU-6/E pallet, and which may be referred to herein as a "master pallet") is a part of the Materials Handling Support System 463L that is standard use by the US military for intermodal cargo transfer in combination with a transport system having roller-type conveyors and restraint rails in transport vehicles and terminals.

A master pallet 200 is traditionally made of exterior metal sheets, such as aluminum, with an inner core made of a relatively soft and light material, such as wood or fiberglass. Rails 201 around the periphery of the master pallet 200 include a number of teeth 202 adapted for releasably locking with mating teeth in transport vehicles and terminals, as well as other adjacent master pallets. A number of tie-down rings 203 are also provided along the rails 201 for securing nets, straps, belts and other restraint devices. The master pallet 200 has standardized dimensions of 88 in. L×108 in. W×2.25 in. H, with usable surface dimensions of 84 in. L×104 in. W, such that there is maintained a two inch margin around a load that is positioned atop the master pallet 200 for the attachment of straps, nets, or other restraint devices for securing the load in place.

Figure 1:
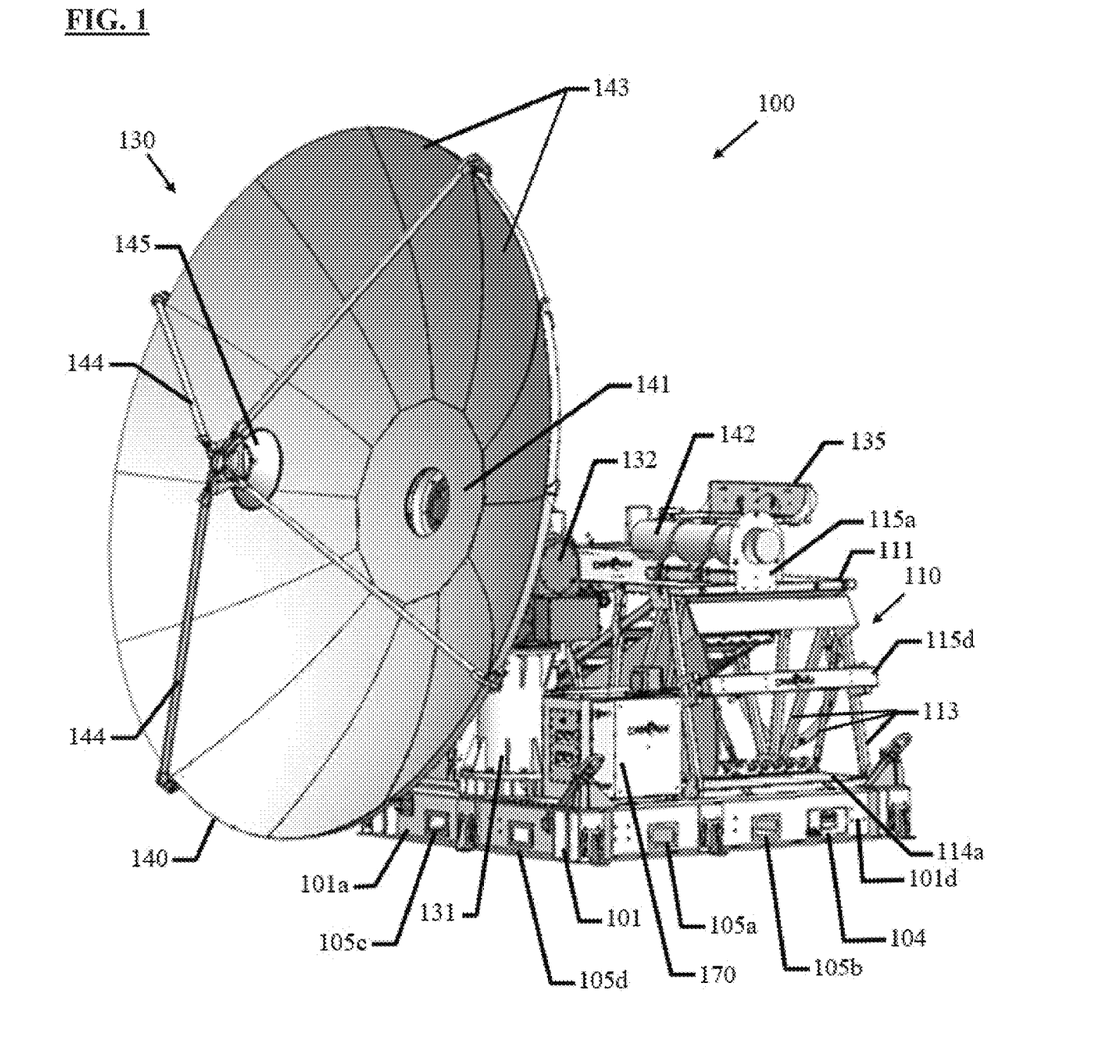
FIG. 1 shows an example of an antenna terminal according to the present invention in an operational configuration.
Figure 2:
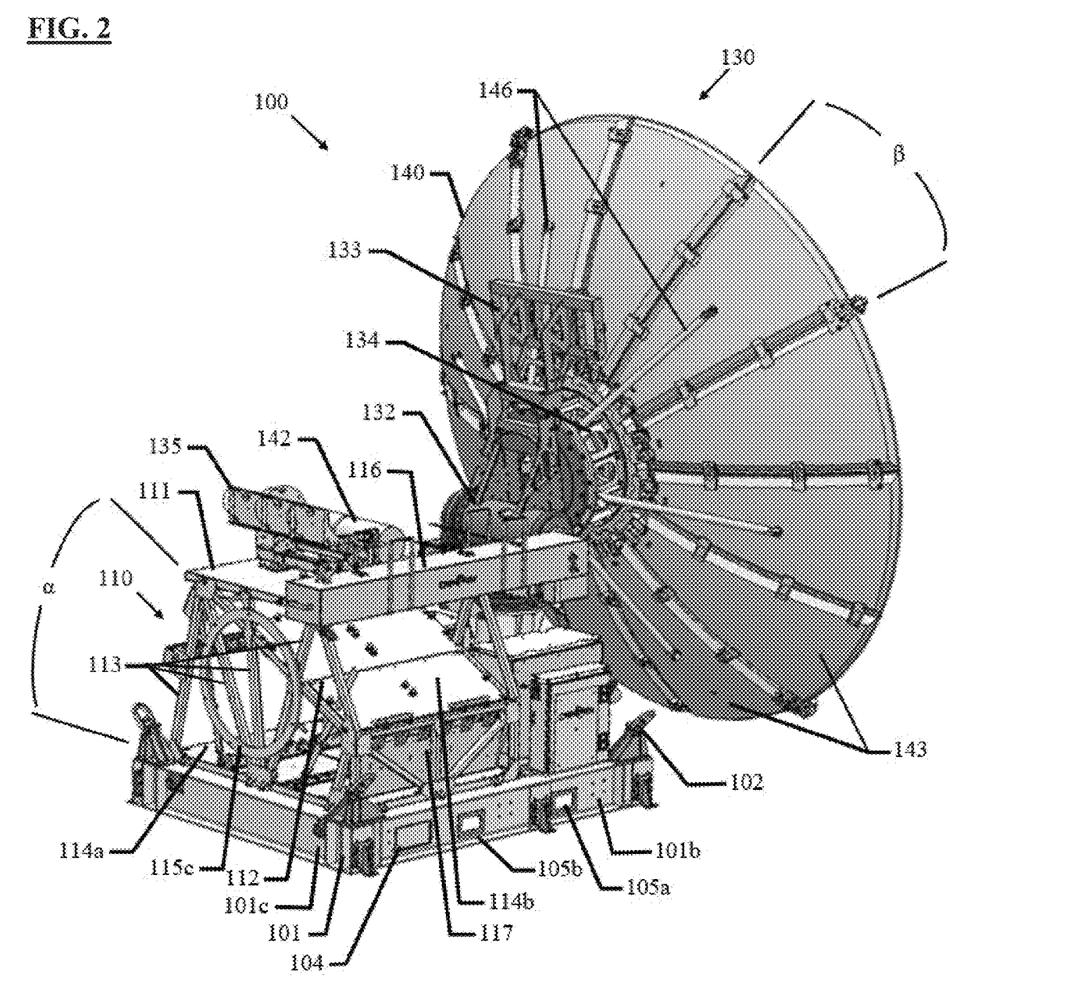
FIG. 2 shows the antenna terminal of FIG. 1 in the operational configuration from a second perspective.
Figure 3:
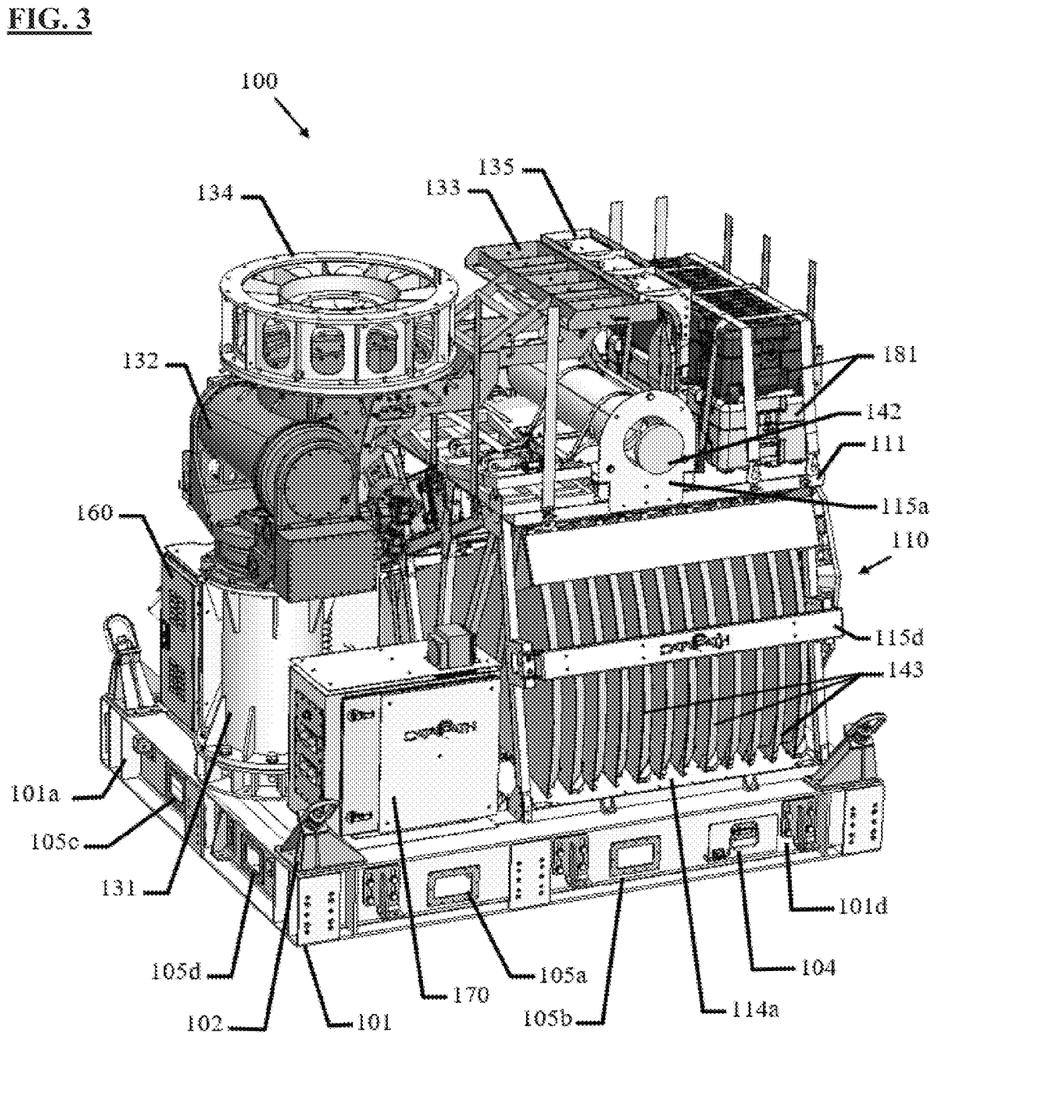
FIG. 3 shows the antenna terminal of FIG. 1 in a storage configuration.
Figure 4:
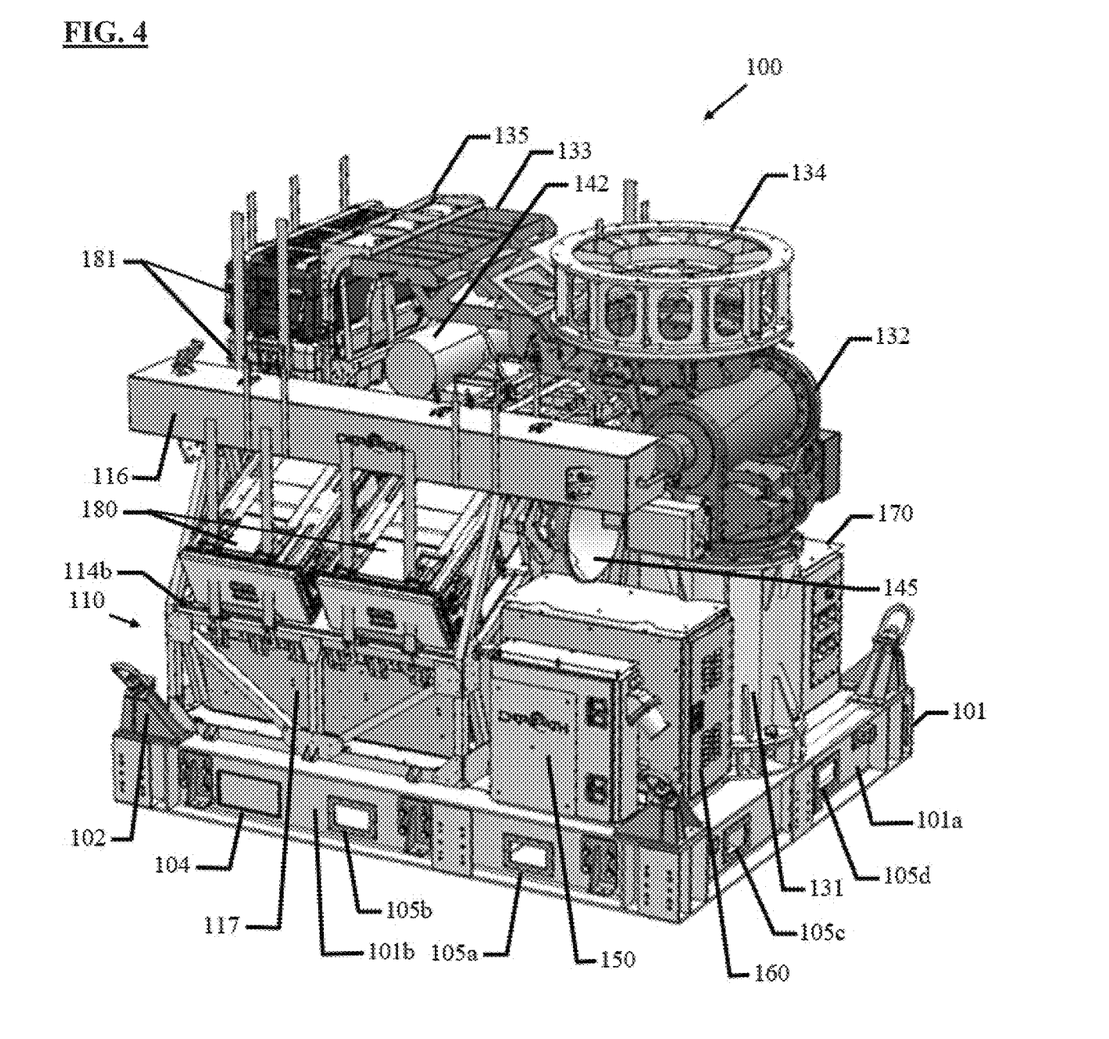
FIG. 4 shows the antenna terminal of FIG. 1 in a storage configuration from a second perspective.
Figure 5:
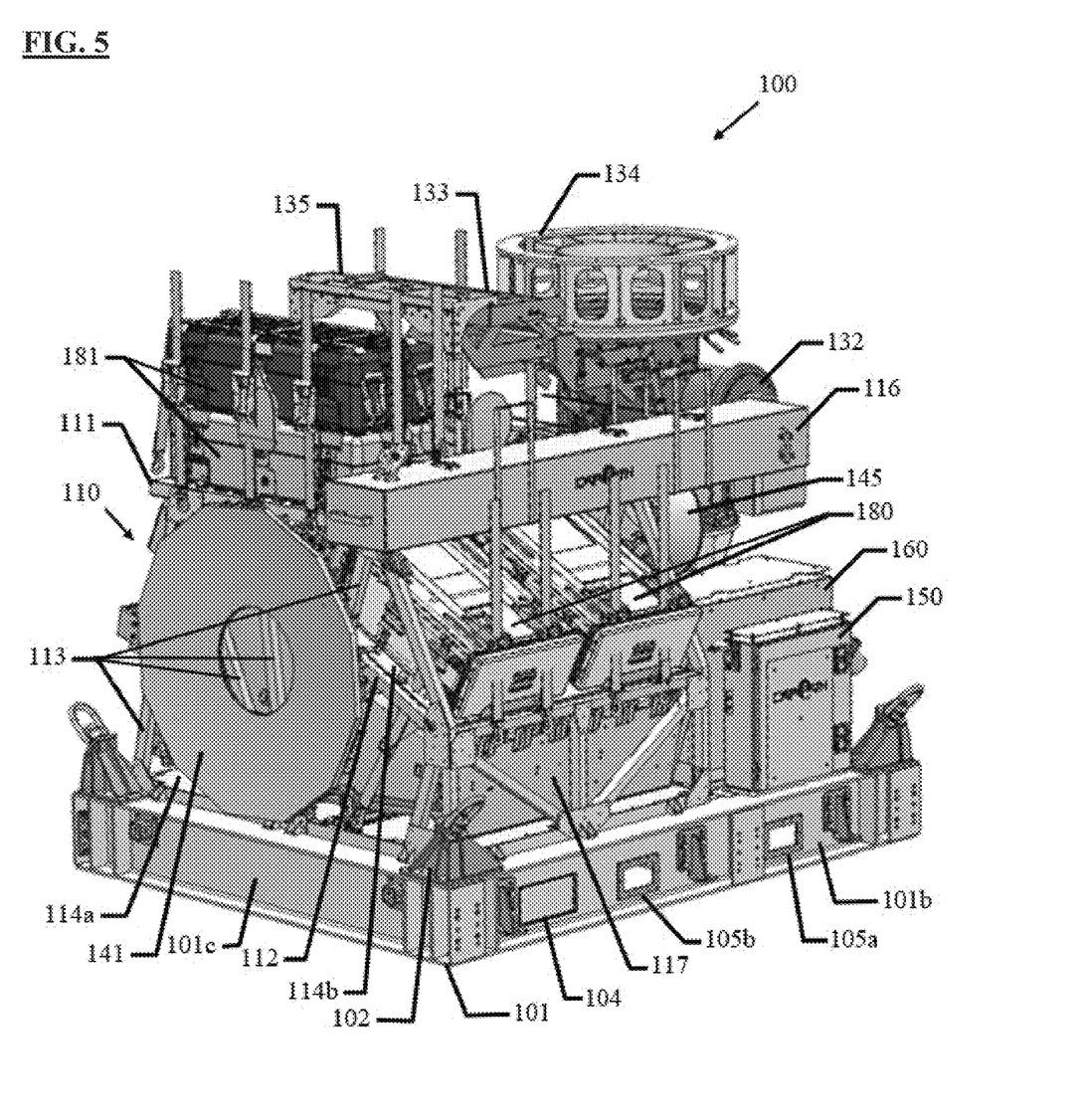
FIG. 5 shows the antenna terminal of FIG. 1 in a storage configuration from a third perspective.
Figure 6:
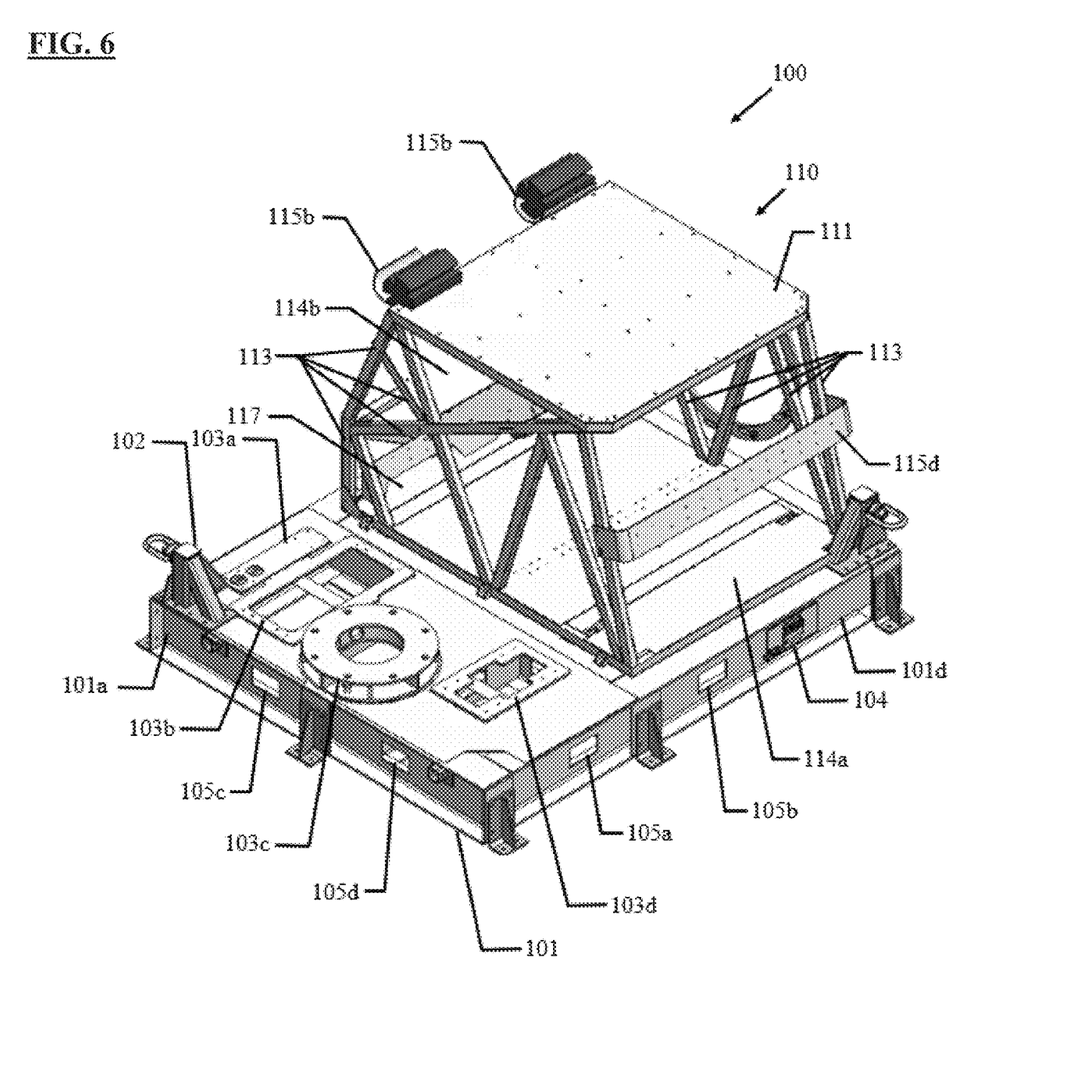
FIG. 6 shows the antenna terminal of FIG. 1 in a disassembled configuration.

FIGS. 1-5 show one example of a satellite communications (SATCOM) terminal 100 according to the present invention. FIGS. 1-2 show two views of the terminal 100 in a deployed configuration, and FIGS. 3-5 show three views of the terminal 100 in a stored configuration. It is noted that the deployed views of the terminal 100 show a feed horn 142 in a stored position, and that in use the feed horn 142 is attached to a center of the reflector hub 141. FIG. 6 shows a view of the terminal 100, with several components omitted therefrom to facilitate illustration of core support structures of the terminal 100, including a deck 101 and a storage frame 110 mounted atop the deck 101. The deck 101 serves as a supporting base for the many terminal components, and the storage frame 110 serves as an organized storage compartment for several terminal components.

The deck 101 has a deck body with maximum footprint dimensions of 84 in. L×104 in. W, and a height of between 6 to 12 inches, thereby fitting within the usable surface dimensions for loading on a master pallet 200. Hoist rings 102 are provided at each corner of the deck 101 for use with one or more support cables for lifting the deck 101 by a hoisting device such as a crane. The hoist rings 102 are also used to attach the terminal 100 to a master pallet 200 or for tie-down on a flatbed truck.

The storage frame 110 is mounted toward a rear end of the deck 101. An opposite front end of the deck 101 is provided with multiple component mounts 103 adapted for releasably coupling several terminal components to the deck 101. In the example shown in FIG. 6, there is provided a power enclosure mount 103a; an uninterruptable power subsystem (UPS) enclosure mount 103b; an antenna kingpost mount 103c; and a control enclosure mount 103d. Each of the several mounts 103 includes an engagement structure adapted for releasably coupling with a mating engagement structure on a corresponding terminal component for selectively engaging and disengaging the respective terminal components with the deck 101. Examples of suitable engagement structures include, though are not limited to, a series of aligned apertures on corresponding mounts and terminal components for releasable coupling via nut and bolt assemblies.

Each of the component mounts 103 further includes at least one cavity that opens into a common interior space of the deck 101 for connecting internal wiring between separate terminal components mounted at the several component mounts 103. For example, electrical power from a power enclosure 150 and control signals from a control enclosure 170 may be delivered to one or more other terminal components mounted at the component mounts 103 through internal wiring that passes through the mount cavities and the common internal space, thereby protecting the wiring from an external environment. The deck 101 further comprises a set of storage compartments 104 for storage of reflector struts 146, as well as additional terminal components and hardware, such as electrical connectors, restraint and anchoring devices, engagement components, etc. The storage compartments 104 may be provided as an extractable drawers that are extendable from within the deck body (e.g., as pull drawers) or as stationary recessed compartments contained entirely within the deck body.

The deck 101 is further provided with at least one pair of channels 105/105 that extend through the deck body and which are dimensioned and spaced from one another to permit align with and permit the insertion of forklift forks so as to enable movement of the terminal 100 by a forklift. In the example shown in the figures, there is provided one pair of channels 105a/105b that open to lateral sides 101b/101d of the deck 101 and which extend entirely through the length of the deck body, and one pair of channels 105c/105d that open to a front side 101a of the deck and which extend through only a portion of the width of the deck body. A pair of channel openings is omitted from the rear side 101a of the deck 101 in the illustrated example in favor of providing additional depth for storage drawers 104. Channels 105 extending from perpendicular sides of the deck 101 (e.g., a lateral side 101b/101d and the front side 101a) may intersect and pass through one another so as to provide sufficient depth for adequate insertion of forklift forks.

The storage frame 110 is mounted toward a rear end of the deck 101 and extends over substantially the entire length (e.g., about 90% to about 100%) and approximately one half the width (e.g., about 45% to about 55%) of a top surface area of the deck 101. The storage frame 110 has a first support panel 111 that is suspended atop a number of beams 113 to present a flat elevated support surface that is oriented in parallel to the top support surface of the deck 101. A second support panel 112 is mounted below the first support panel 111, between the top support surface of the deck 101 and a bottom surface of the first support panel 111. The second support panel 112 is suspended by one or more of the same beams 113 on which the first support panel 111 is suspended, though the second support panel 112 is oriented at an angle α (see FIG. 2) that is oblique to both the top support surface of the deck 101 and the support surface of the first support panel 111.

The first support panel 111 and the beams 113 define an enclosed space between the top surface of the deck 101 and the bottom surface of the first support panel 111, and the obliquely oriented second support panel 112 divides the enclosed space into two separate storage spaces. A first storage space 114a, located between the top surface of the deck 101 and the bottom surface of the second support panel 112, is dimensioned for storage of antenna reflector panels 143, with an opening into this storage space 114a being defined between the upper surface of the deck 101 the lower surface of the first support panel 111 for insertion and extraction of reflector panels 143. A second storage space 114b, located between the top surface of the second support panel 112 and the bottom surface of the first support panel 111, is dimensioned for the storage of one or more transit cases 180 that house modems for use in operating the terminal 100, with an opening into this storage space 114b being defined between the upper surface of the second support panel 112 and the lower surface of the first support panel 111 for insertion and extraction of transit cases 180.

The storage frame 110 is provided with a number of securing mechanisms 115 for fixedly securing and retaining terminal components in place in the stored configuration. The securing mechanisms 115 may include one or more securing straps, one or more shaped receptacle surfaces, one or more rotatable and locking arms, and/or one or more rotating locking panels that may each be adapted to secure and lock terminal components in place, or to close or at least sufficiently reduce the respective openings to storage spaces to prevent unintended damage or removal of terminal components during transport of the terminal 100.

A top surface of the first support panel 111 serves as a further storage space for additional terminal components. In some examples, securing mechanisms 115 are provided at the top surface of the first support panel 111 for securing in place one or more of: an antenna feed horn 142; sub-reflector support struts 144; and/or one or storage containers 181 (or alternatively, additional modem transit cases). In the example shown in FIGS. 1 and 3, a feed horn 142 is secured in place by both a shaped receptacle 115a in which one end of the feed horn 142 is inserted, and a number of releasable tie-down straps around the body of the feed horn 142. In the same example, two supplemental storage containers 181 are secured to the top of the first support panel 111 by a number of releasable straps. The sub-reflector support struts 144 are stored in a container 116 that is affixed to the first support panel 111 of the storage frame 110. In the example shown in FIGS. 2, 4 and 5, the container 116 is illustrated as a lockbox, however, the container may take any other suitable form. For example, the container 116 may also be of a flexible bag-type that is capable being secured to a receiving surface on the storage fame 110, such as the curved receptacles 115b shown in FIG. 6.

As shown in FIG. 2, a shaped receptacle 115c is provide on a rear exterior outer surface of the storage frame 110 for reception of a reflector hub 141. In the illustrated example, the shaped receptacle 115c is provided as a support ring adapted for releasably engaging the reflector hub 141. In some examples, additional securing mechanisms may also be provided for further securing the reflector hub 141, including though not limited to: one or more securing straps, one or more rotatable and locking arms, and/or a full rotating and locking panel. Though shown as a support ring in the illustrated example, the shaped receptacle 115c for the reflector hub 141 may instead be provided in other shapes, such as a semi-circular slot dimensioned for insertion of the reflector hub 141.

The terminal 100 is used for supporting a satellite antenna 130 that includes a parabolic reflector 140 that is secured to an antenna ring 134 that resides atop a motorized antenna positioner 132. The positioner 132 is supported by a king-post shaft 131 that is bolted to the mount 103c on the deck 101. In addition to the antenna ring 134, the antenna positioner 132 also supports a radio-frequency communications mounting bracket 133 that in turn supports a number of radio-frequency electronics (not shown), including though not limited to transmitters, receivers and amplifiers. Beneficially, the radio-frequency components mounted to the RF mounting bracket 133 may remain mounted thereto even when the terminal 100 is placed in a storage configuration, thereby avoiding additional time and labor that would otherwise be needed to attach/detach those components when converting the terminal 100 between operational and storage configurations.

The antenna reflector 140 is a modular parabolic reflector that comprises a central reflector hub 141, a plurality of circumferential reflector panels 143 that connected around a circumference of the reflector hub 141, a feed horn 142 that connects to a center of the reflector hub 141, and a sub-reflector 145 that is suspended forward of the reflector hub 141 by a plurality of sub-reflector struts 144 that connect to exterior edges of reflector panels 143. In the assembled configuration, the parabolic reflector 140 is mounted to the positioner 132 by coupling the reflector hub 141 to the antenna ring 134, and positioning a number of reflector struts 146 to extend between the antenna ring 134 and a number of reflector panels 143.

In the illustrated example, the reflector 140 is formed with twelve reflector panels 143 of corresponding dimensions that are each releasably engageable with the reflector hub 141 and four sub-reflector struts 144 for positioning equidistantly around the assembled reflector 140 for supporting the sub-reflector 145 in an operational position. In other examples, the reflector 140 may be made with a different number of reflector panels 143 and/or sub-reflector struts 144. Regardless of the number of modular panels, it is preferable that each reflector panel 143 be equally sized and dimensioned, including that each reflector panel 143 have a common taper angle β as defined by circumferential peripheral edges of the respective panel 143 (see FIG. 2). It is likewise preferable that the second support panel 112 of the storage frame 110 be oriented at an oblique angle α that corresponds with the taper angle β of the reflector panels 143, such that the reflector panel storage space 114a is shaped to provide a fitted reception of the reflector panels 143 with little tolerance for jostling of the reflector panels 143 during transportation of the terminal 100.

Figure 7:
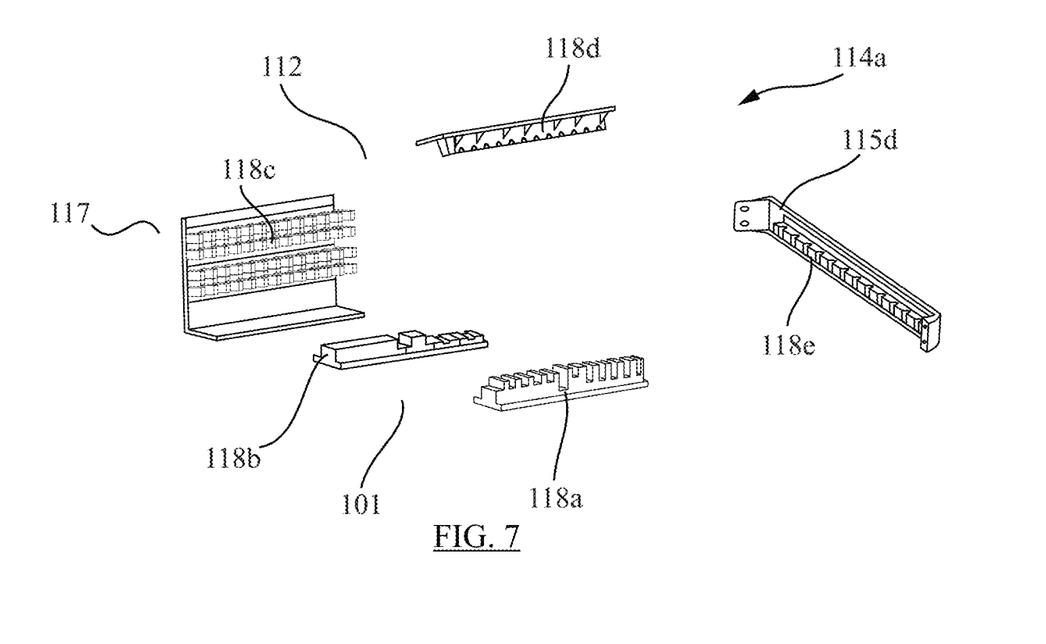
FIG. 7 shows spacer elements inside the storage area in the antenna terminal of FIG. 1 for receiving and securing a number of antenna reflector panels in a spaced arrangement.

In the illustrated example, the reflector panel storage space 114a is defined between the top surface of the deck 101, a vertical panel 117, and bottom surface of the second support panel 112. A securing device, in the form of a removable or rotatable and lockable bar 115d, is mounted to the storage frame 110 and is removable or rotatable between an open position for enabling access to the storage space 114a and a closed position for sufficiently limiting access to the storage space 114a to prevent removal of the reflector panels 143 therefrom. A number of spacer elements 118 are provided within the reflector panel storage space 114a for individually securing and spacing the separate reflector panels 143 to prevent unintended shifting and damage during transportation. For example, as shown in FIG. 7, one or more arrangements of spacer elements 118a/118b may be provided at the top surface of the deck 101, and one or more arrangements of spacer elements 118c may likewise be provided at an inner side of the vertical panel 117. In addition, one or more arrangements of spacer elements 118d may be provided at a bottom surface of the second support panel 112, and one or more arrangements of spacer elements 118e may be provided at an inner side of the removable or rotatable arm 115d. The separate arrangements of spacer elements 118a-118d are positioned and dimensioned to align with one another for receiving the several reflector panels 143 in a tightly packed spacing with sufficient spacing to prevent collision of the several reflector panels 143 during transportation of the terminal 100. In one example, the spacer elements 118a-118d may be formed of flexible shock-absorbing material, such as neoprene, and may be dimensioned to provide a spacing of between 0.5 to 2.0 inches between adjacent reflector panels 143.

When disassembling the antenna 130 from an operational state to be placed in a storage state, the sub-reflector 145 is removed from the sub-reflector struts 144, the struts 144 are detached from the reflector 140, the reflector struts 146 are detached from between the reflector panels 143 and the antenna ring 134, the reflector panels 143 are detached from one another and from the reflector hub 141, the feed horn 142 is removed from the reflector hub 141, and the reflector hub 141 is detached from the antenna ring 134. The sub-reflector struts 144 are stored in the container 116, and the reflector struts are stored in the storage compartments 104. The sub-reflector 145 is secured to an external surface of one or more beams 113 of the storage frame 110. The reflector panels 143 are stored in the reflector panel storage space 114a within the storage frame 110, positioned between the deck 101 and the oblique second support panel 112; the feed horn 142 is stored in the shaped receptacle 115a atop the first support panel 111, and the reflector hub 141 is secured to the shaped receptacle 115c on the exterior of the storage frame 110.

Once the antenna components are stored, the antenna positioner 132 is rotated to a sky-facing orientation, resulting in the radio-frequency communications mounting bracket 133 being titled rearward to a substantially horizontal position. A rotatable locking plate 135 is adapted for engaging the mounting bracket 133 to secure the mounting bracket 133 in the horizontal position. In the stored horizontal position, RF components mounted to the RF mounting bracket 133 are positioned underneath an outward sky-facing surface of the mounting bracket 133. With this configuration, the RF components (not shown) may remain mounted to the mounting bracket 133, with the mounting bracket 133 and locking plate 135 together serving as a protective barrier that prevents damage to the RF components during transportation of the terminal 100. Likewise, the feed horn 142 mounted atop the first support panel 111 also benefits from the same protective barrier formed by the mounting bracket 133 and locking plate 135 in the storage configuration. Storage containers 181 (or additional transit cases) intended for support on the first support panel 111 are secured in place after the locking plate 135 is rotated to secure the mounting bracket 133. In the storage state, the terminal 100 has a maximum height of less than 92 in.

The storage frame 110 is configured to support two transit cases 180 in the transit storage space 114b, with the transit cases 180 resting atop the obliquely oriented second support panel 112 and below the horizontal first support panel 111.

The transit cases 180 are designed to receive two one-rack unit (1RU) modems and include wiring for connecting with the control enclosure 170 and the power enclosure 150. The transit cases 180 may optionally include an environmental control unit (ECU) for cooling the modems when used in a non-temperature controlled environment. The transit cases 180 may include any preferred modem type based on the intended use and operation of the antenna 130, and may include, though are not limited to: Comtech DMD-2050/E; Datum M7; ViaSat EBEM MD-1366; ViaSat Linkway S2; iDirect MDM-9000; and L-3 MPM-1000/3000. In the example shown in FIGS. 4-5, when in the stored configuration, the transit cases 180 are releasably secured in the modem storage space 114b by a number of straps, and are removable from the modem storage space 114b and separable from the terminal 100 upon releasing the straps.

A weatherized control enclosure 170 engaged to the control enclosure mount 103d of the deck 101 contains electronics for operation of the terminal 100. Generally, the control enclosure contains operational hardware such as coax to fiber optic modules for establishing communications over predetermined radio frequencies and intermediate frequency channels, such as the X-, Ka-, and Ku-band channels, as well as for distributing power to the SSPAs and LNBs. The control enclosure 170 contains a 10 MHz frequency reference unit (FRU), with a rubidium oscillator, for providing a high stability, precision reference to the SSPAs, LNBs and modems.

The control enclosure 170 contains hardware, such as an Ethernet switch, for connecting all terminal component electronics to an embedded computing element (ECE) that stores monitoring and control (M&C) software, as well as an integrated spectrum analyzer and beacon receiver for acquiring, peaking and tracking satellites. One example of suitable M&C software is the MaxView® M&C software, available from DataPath, Inc. The control enclosure 170 is provided with a 4-channel, single-mode, tactical fiber optic cable assembly (TFOCA) interface adapted for connecting to a corresponding fiber optic module of a modem that is either in a transit case (transit cases 180) or some other enclosure, such as a nearby tent or building. The control enclosure 170 also includes fiber optic inter-facility links (IFL) that permit the control enclosure to communicate with between 1 to 32 separate modems per polarization.

A weatherized power enclosure 150 is engaged to the power enclosure mount 103a of the deck 101, and a weatherized UPS enclosure 160 is engaged to the UPS enclosure mount 103b of the deck 101. The power enclosure 150 contains electrical systems adapted for supporting worldwide power, with single, split and three-phase power options, at 50 Hz or 60 Hz input (110-230V single-phase or 200-415V three-phase), without requiring a separate transformer. The power enclosure 150 includes a shore power input to permit the reception and use of power from an external source, and the UPS enclosure 160 contains electrical systems for making any necessary conversions to incoming shore power as needed for powering the terminal components. The UPS enclosure 160 includes UPSs that provide up to ten minutes of battery back-up power to the terminal 100 in the event that shore power fails. The power enclosure 150 also comprises one or more power connectors for connecting to and powering transit cases 180 that are used in operation of the terminal 100.

When loaded with all components described herein, the terminal 100 has a total weight of equal to or less than 10,000 lbs., preferably equal to or less than 7,500 lbs., and more preferably equal to or less than 5,000 lbs. The relatively reduced weight of the terminal 100 may be achieved, for example, by constructing at least the deck 101 of a light weight and durable material, such as aluminum. Preferably, one or more of the further components are also constructed of the same or similar light weight material, including, though not limited to the storage frame 110, the power enclosure 150, the UPS enclosure 160, the control enclosure 170, and/or the kingpost shaft 131. When loaded with all components supported thereon, the deck 101 has a maximum footprint equal to or less than 84 in. L×104 in. W. When placed in the storage state, with all components stored thereon, the terminal 100 has a maximum height of less than 92 in. With this self-contained construction, the limited footprint of the deck 101 enables ready loading and transportation of the terminal 100 on a standard intermodal platform, in the form of a master pallet 200. This reduced footprint, as well as the limited height of the terminal 100 in the storage state, makes the terminal 100 especially well-suited for transportation by standard military vehicles (as well as vessels, craft, etc.) and through transportation centers. In addition, the relatively light weight of the terminal 100 further facilitates movement and transport of the terminal 100 with only light load systems and light weight vehicles, such as fork-lifts and light medium tactical vehicles (LMTV), that are in common use by the military, without requiring specialty large weight systems and vehicles that would require additional resources and labor.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated.

The present invention is not limited to the exemplary embodiments illustrated herein, but is instead characterized by the appended claims, which in no way limit the scope of the disclosure.

What is claimed is:

1. A portable antenna terminal, comprising:
a deck having a deck body and a top support surface;
a storage frame mounted to the top support surface of the deck, the storage frame defining a first storage space dimensioned for storing a plurality of reflector panels;
an antenna comprising an antenna kingpost shaft, an antenna positioner, and a parabolic reflector; and an uninterruptable power subsystem (UPS) enclosure mounted to the top support surface of the deck, the UPS enclosure housing electrical systems for converting the current and/or frequency of an electrical energy received from an external power source and providing battery backup.

2. The portable antenna terminal according to claim 1, further comprising:
a power enclosure mounted to the top support surface of the deck, the power enclosure housing electrical systems for powering one or more electrical components of the terminal.

3. The portable antenna terminal according to claim 1, further comprising:
a control enclosure mounted to the top support surface of the deck, the control enclosure housing operational hardware for controlling operation of one or more components of the terminal.

4. The portable antenna terminal according to claim 1, wherein
the storage frame further defines a second storage space dimensioned for storing one or more transit cases, and wherein the terminal further comprises one or more transit cases each housing a modem for user operation in controlling the terminal.

5. The portable antenna terminal according to claim 1, further comprising:
a power enclosure mounted to the top support surface of the deck, the power enclosure housing electrical systems for powering one or more electrical components of the terminal;
a control enclosure mounted to the top support surface of the deck, the control enclosure housing operational hardware for controlling operation of one or more components of the terminal; and
one or more transit cases, each transit case housing a modem for user operation in controlling the terminal, wherein
the terminal has a total weight of equal to or less than 10,000 lbs.

6. The portable antenna terminal according to claim 5, wherein
the terminal has a total weight of equal to or less than 7,500 lbs.

7. The portable antenna terminal according to claim 5, wherein
the terminal has a total weight of equal to or less than 5,000 lbs.

8. A portable antenna terminal, comprising:
a deck having a deck body and a top support surface;
an antenna kingpost mount for reception of an antenna kingpost shaft; and
a storage frame mounted to the top support surface of the deck, the storage frame defining at least one storage space and configured for storing a plurality of circumferential reflector panels with individually stored reflector panels oriented such that circumferential edges thereof extend in a substantially vertical direction within the storage space.

9. The portable antenna terminal according to claim 8, wherein
the deck comprises one or more transport structures for facilitating movement and transportation of the terminal.

10. The portable antenna terminal according to claim 9, wherein
the deck comprises transport structures in the form of a pair of channels formed in the body of the deck that are dimensioned and spaced for the insertion of forklift forks.

11. The portable antenna terminal according to claim 9, wherein
the deck comprises transport structures in the form of multiple hoist rings for use with one or more support cables for lifting the deck by a hoisting device as well as tie-down.

12. The portable antenna terminal according to claim 8, wherein
the modular parabolic reflector further comprises a central reflector hub, and
the storage frame comprises a receptacle for secured reception of the reflector hub.

13. The portable antenna terminal according to claim 8, wherein
the terminal is configured such that, when in a storage state, with plurality of reflector panels and central reflector hub secured in stored positions, the terminal has a maximum height of less than 92 in.

14. The portable antenna terminal according to claim 8, wherein:
the storage frame comprises at least two support panels suspended above the top support surface of the deck, including a first support panel suspended in a parallel orientation relative to the top support surface of the deck and a second support panel suspended in an oblique orientation relative to the top support surface of the deck, and
the storage space dimensioned for storing a plurality of reflector panels is defined below the first parallel-oriented support panel.

15. The portable antenna terminal according to claim 14, wherein:
the storage space dimensioned for storing a plurality of reflector panels is defined below the second obliquely-oriented support panel.

16. The portable antenna terminal according to claim 8, wherein:
the terminal further comprises an antenna having a modular reflector that is configured to disassemble into a plurality of circumferential reflector panels, and
the storage space dimensioned for storing a plurality of reflector panels is defined by two support surfaces that are positioned to define an angle therebetween that corresponds with an angle formed by circumferential peripheral edges of the individual reflector panels.

17. The portable antenna terminal according to claim 8, wherein
the storage frame comprises at least one support panel suspended above the top support surface of the deck, and the storage space is defined between the at least one suspended support panel and the top support surface of the deck forming an angle.

18. The portable antenna terminal according to claim 17, wherein:
the at least one suspended support panel is suspended in a parallel orientation relative to the top support surface of the deck.

19. The portable antenna terminal according to claim 17, wherein:
the at least one suspended support panel is suspended in an oblique orientation relative to the top support surface of the deck.

20. The portable antenna terminal according to claim 8, wherein the deck is configured with dimensions equal to or less than 84 in. L×104 in. W.

21. The portable antenna terminal according to claim 8, wherein
the storage frame is configured for storing a plurality of circumferential reflector panels with individually stored reflector panels aligned one behind another in a series of substantially vertically oriented reflector panels.

22. The portable antenna terminal according to claim 8, wherein
the storage frame comprises spacer elements arranged within the storage space and configured to support stored reflector panels in the substantially vertical orientation with spacing between adjacent reflector panels.

* * * * *